Feb. 12, 1957 A. G. VELDHUIZEN 2,781,199
DEVICE FOR CLAMPING A TOOL OR A DISC ON
THE HOLDER OF A MACHINE TOOL
Filed Jan. 7, 1955 2 Sheets-Sheet 1

INVENTOR
ADRIANUS G. VELDHUIZEN

Feb. 12, 1957  A. G. VELDHUIZEN  2,781,199
DEVICE FOR CLAMPING A TOOL OR A DISC ON
THE HOLDER OF A MACHINE TOOL
Filed Jan. 7, 1955  2 Sheets-Sheet 2

INVENTOR
ADRIANUS G. VELDHUIZEN
BY

United States Patent Office 2,781,199
Patented Feb. 12, 1957

2,781,199

DEVICE FOR CLAMPING A TOOL OR A DISC ON THE HOLDER OF A MACHINE TOOL

Adrianus G. Veldhuizen, Zaandijk, Netherlands, assignor to N. V. Nederlandsche Machinefabriek "Artillerie-Inrichtingen," Zaandam, Netherlands, a company of the Netherlands Application January 7, 1955, Serial No. 480,431

Claims priority, application Netherlands January 12, 1954

6 Claims. (Cl. 279—77)

The invention relates to a device for clamping a tool in the tapered bore of a holder or for clamping a disc provided with a tapered bore on a conical holder of a machine tool by means of one or more rotatable locking bolts having an eccentric portion acting on the wall of a recess in the shank of the tool or in a stud secured to the disc to be clamped said locking bolt having its axis perpendicularly directed to the axis of the tool shank or of the stud secured to the disc and said eccentric portion of the locking bolt having an arcuate notch for releasing the tool shank or the stud.

With the known clamping devices of this kind, when the locking bolt has been turned for releasing the tool or the disc, it is necessary to drive the tool out of the tapered bore or the disc away from the conical holder.

The invention has for its object to avoid this detrimental operation and, to this end, the eccentric portion of the locking bolt has such a shape that said bolt, when turned from clamping position, cooperates with a surface at the wall of the recess in the tool shank or in the stud on the disc for ejecting the latter from the holder. Preferably, the eccentric portion of the locking bolt, when turning the bolt from clamping position, cooperates with a convex surface of the wall of the recess and said eccentric portion is bevelled at the edge cooperating with said convex surface. This bevelled surface exerts a force having an axially directed component on the tool shank or the stud of the clamping disc, whereby the tool or disc is released.

The invention will be further described with reference to the accompanying drawings, showing two embodiments of the clamping device according to the invention, and wherein.

Figure 1:
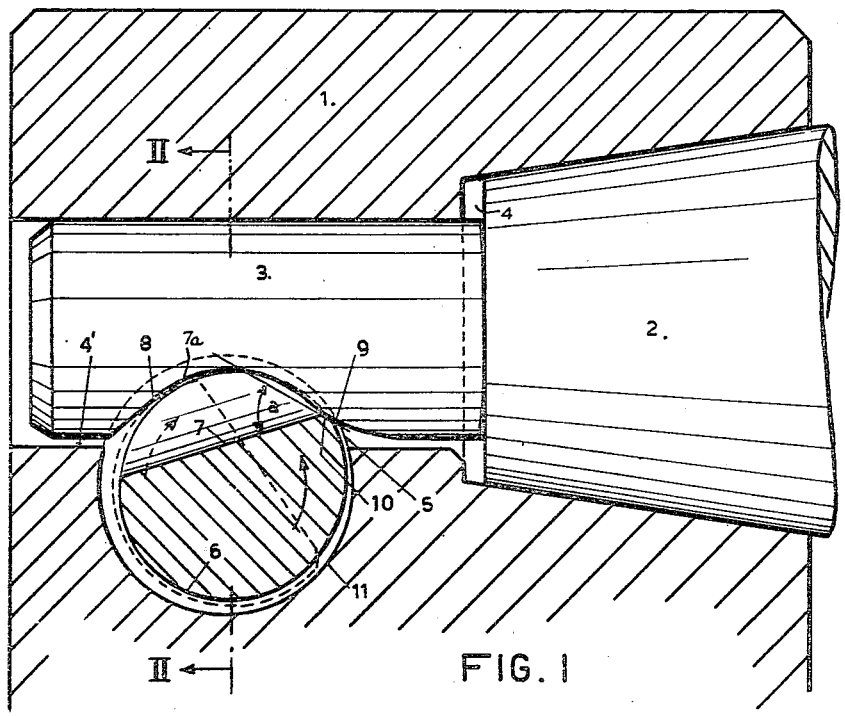
Fig. 1 is a longitudinal sectional view of part of a holder with a tool shank clamped therein.
Figures 2, 3:
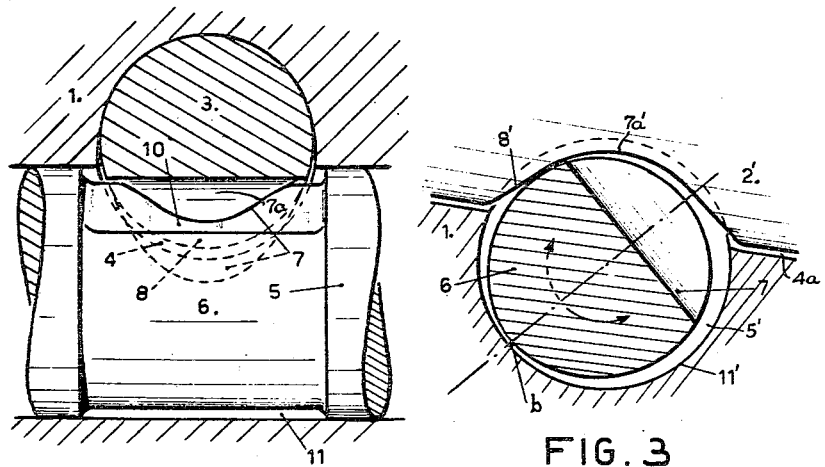
Fig. 2 is a cross sectional view taken on line II—II of Fig. 1.
Fig. 3 is a fragmentary sectional view of a modification of the embodiment shown in Figs. 1 and 2.

In Figs. 1 and 2 the numeral 1 designates part of a tool holder having a tapered bore 4 in which the conical shank 2 of a tool is clamped. The conical shank 2 has a cylindrical extension 3, extending, with some clearance, into a substantially cylindrical bore 4' opening into the smaller end of the tapered bore 4 of the holder. A cylindrical locking bolt 5 is rotatably journalled in a transverse bore 11 of the holder 1 and this bore 11 intersects the bore 4' and has its axis perpendicularly directed to the axis of the tool shank 2, 3.

The locking bolt 5 is provided with an eccentric or cam shaped portion 6 having a spiral-shaped circumference and a notch 7, the latter allowing the passage of the cylindrical shank portion 3. The shank 3 is provided with a recess 7a and the wall 8 of said recess cooperates with the eccentric portion 6 of the locking bolt for clamping the cone 2 in the holder when turning the bolt in the direction of the dotted arrow in Fig. 1 to its dotted line position. The recess 7a in the shank 3 is bounded at the opposite side by a convexly curved surface 9 cooperative with a bevelled surface 10 of the eccentric portion 6 of the locking bolt 5 for ejecting the cone 2 from the tapered bore in the holder when turning the bolt 5 in the direction of the full line arrow in Fig. 1. In the embodiment according to Figs. 1 and 2, the bevelled surface 10 encloses an angle $a$ of about 45° with the generating line of the notch 7 in the locking bolt 5.

As shown in Fig. 3 the locking bolt 5' with its eccentric spiral shaped portion 6' may also cooperate directly with the cone 2' of the tool shank, a recess 7a' being provided in said cone and the bolt bore 11' intersecting the tapered bore 4a in the holder 1'. In this modified embodiment, the recess 7a' and its wall 8' is symmetrical. The circumference of the cam shaped portion 6' of the locking bolt is also symmetrically shaped and has its largest radius at the middle $b$ of the curved circumference of the portion 6'. The action of the locking bolt is now the same for both directions of rotation, so that when turning the bolt in the direction of the dotted line arrow the shank 2' is clamped in the bore of the holder, whereas the shank is driven out of the holder when the bolt 5' is turned in the direction of the full line arrow in Fig. 3.

Figure 4:
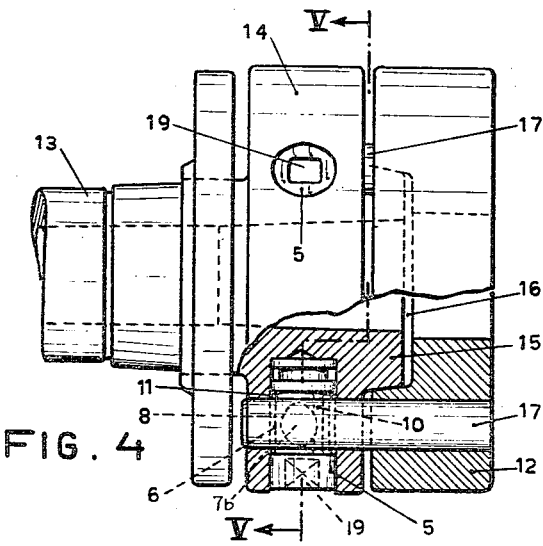
Fig. 4 is an elevation with part in section of a disc clamped on the spindle of a machine tool.
Figure 5:
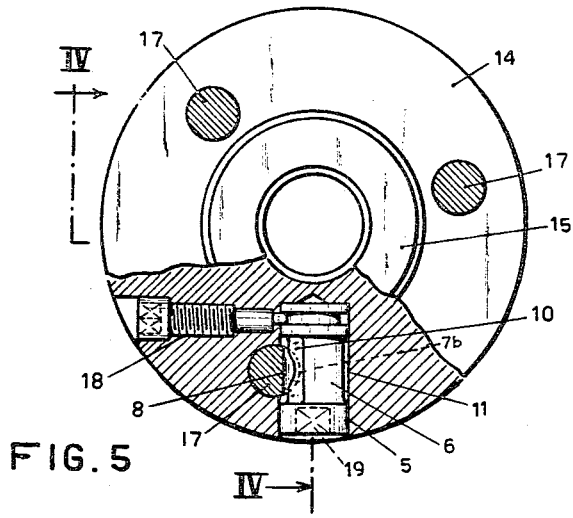
Fig. 5 is a sectional view taken on line V—V of Fig. 4.

In the embodiment shown in Figs. 4 and 5 the locking bolt 5 is used for clamping a disc 12, e. g. a chuck, on the spindle 13 of a machine tool. To this end said spindle is provided with a flange 14 having a conical collar 15 and the disc 12 is provided with a correspondingly tapered bore 16. Secured to the disc 12 are three studs 17 having recesses 7b adapted to enter into holes 4b in the flange 14. The studs 17 are locked in the flange 14 by means of locking bolts 5 inserted into holes 11a in the flange. The recess 7b of the studs 17 may have the same shape as shown in Fig. 1 and the eccentric portion 6 of the bolts 5 is correspondingly shaped as that of the bolt 5 according to Fig. 1. Each bolt 5 is secured against axial displacement by a set screw 18 and may be turned by means of a wrench and to this end the bolt has a square socket at its outer end for receiving the wrench.

What I claim is:

1. In a device for clamping the conical portion of a tool or like member having at least one shank with a transverse recess in one side thereof to the mating conical portion of a cooperative member having at least one bore for receiving said shank and rotatably supporting a locking bolt disposed perpendicularly to the axis of and partially intersecting said bore, said locking bolt having a locking portion for rotation into said shank recess to lock the conical portions in mating relation and a notch in one side of said locking portion for permitting the passage of said shank, the improvement in said locking bolt locking portion comprising a cam having a surface eccentric to the axis of said bolt and cooperatively engages the opposite end surfaces of said shank recess upon rotation of said bolt in respectively opposite directions for camming said shank longitudinally into and out of said bore, respectively.

2. In a device as set forth in claim 1, said shank comprising said conical portion.

3. In a device as set forth in claim 2, said transverse recess being in said conical portion.

4. In a device as set forth in claim 1, a plurality of said shanks spaced around said conical portion.

5. In a device as set forth in claim 4, said conical portion comprising a recess.

6. In a device as set forth in claim 1, said cam portion having a beveled surface cooperative with a convexly curved surface at one end of the shank recess when the locking bolt is rotated in the direction for urging said shank out of said bore.

References Cited in the file of this patent

UNITED STATES PATENTS

| | | |
|---|---|---|
| 1,785,495 | Richard | Dec. 16, 1930 |
| 2,433,127 | Kinzbach | Dec. 23, 1947 |